US008832755B2

(12) United States Patent
Gazier et al.

(10) Patent No.: US 8,832,755 B2
(45) Date of Patent: Sep. 9, 2014

(54) METHODS AND SYSTEMS FOR INTERACTIVE VIDEO TRANSPORT OVER ETHERNET NETWORKS

(75) Inventors: Michael A. Gazier, Ottawa (CA); Morteza Ghodrat, Kanata (CA); Ian H. Duncan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 913 days.

(21) Appl. No.: 11/796,799

(22) Filed: Apr. 30, 2007

(65) Prior Publication Data

US 2008/0271096 A1 Oct. 30, 2008

(51) Int. Cl.
| | |
|---|---|
| *H04L 12/00* | (2006.01) |
| *H04N 7/173* | (2011.01) |
| *H04N 21/432* | (2011.01) |
| *H04N 21/266* | (2011.01) |
| *H04N 21/472* | (2011.01) |
| *H04N 21/643* | (2011.01) |
| *H04N 21/61* | (2011.01) |

(52) U.S. Cl.
CPC ....... *H04N 7/17318* (2013.01); *H04N 21/4325* (2013.01); *H04N 21/26616* (2013.01); *H04N 21/47202* (2013.01); *H04N 21/64322* (2013.01); *H04N 21/6125* (2013.01); *H04N 21/6175* (2013.01)
USPC ................ 725/93; 725/98; 725/116; 725/118

(58) Field of Classification Search
CPC ...................... H04N 21/6125; H04N 21/3175
USPC ............ 725/14–104, 116; 709/219, 231, 245
See application file for complete search history.

(56) References Cited

U.S. PATENT DOCUMENTS

| | | | |
|---|---|---|---|
| 6,484,318 B1 * | 11/2002 | Shioda et al. ................ 725/110 |
| 2001/0029612 A1 * | 10/2001 | Harnois ........................ 725/86 |
| 2004/0133920 A1 * | 7/2004 | Kim et al. ..................... 725/129 |
| 2004/0199576 A1 * | 10/2004 | Tan .............................. 709/203 |
| 2005/0039212 A1 * | 2/2005 | Baran et al. ................... 725/91 |
| 2005/0044273 A1 * | 2/2005 | Bouchat et al. ............... 709/245 |
| 2005/0238005 A1 * | 10/2005 | Chen et al. .................... 370/389 |
| 2005/0240799 A1 * | 10/2005 | Manfredi et al. ............... 714/4 |
| 2005/0289618 A1 * | 12/2005 | Hardin .......................... 725/95 |
| 2007/0047540 A1 * | 3/2007 | Bragg et al. .................. 370/386 |
| 2007/0274321 A1 * | 11/2007 | Jonsson et al. ........... 370/395.53 |
| 2008/0127255 A1 * | 5/2008 | Ress et al. ..................... 725/38 |

* cited by examiner

*Primary Examiner* — Mark D Featherstone
*Assistant Examiner* — Carmine Malangone
(74) *Attorney, Agent, or Firm* — Clements Bernard PLLC; Christopher L. Bernard; Lawrence A. Baratta, Jr.

(57) ABSTRACT

The present invention provides methods and systems to remove the dependence on the IP layer (OSI layer three) in Video-on-Demand (VoD) transport networks. The present invention replaces the IP layer with Ethernet layer two addressing and even layer one, allowing connectivity in access/aggregation networks without IP layer three capabilities. The present invention enables STBs to communicate with VoD controllers, servers, and the like at layer two and/or layer one, eliminating the need for layer three routing capabilities in access/aggregation networks.

20 Claims, 5 Drawing Sheets

METHODS AND SYSTEMS FOR INTERACTIVE VIDEO TRANSPORT OVER ETHERNET NETWORKS

FIELD OF THE INVENTION

The present invention relates generally to networks carrying interactive video. More specifically, the present invention provides methods and system to transport interactive video, such as Video-on-Demand, between two points utilizing layer two transport mechanisms in place of Internet Protocol (IP) layer transport.

BACKGROUND OF THE INVENTION

Internet Protocol (IP) (i.e., Open Systems Interconnect (OSI) layer three) provides data communications across a network. Currently, IP is used to connect devices and request services. For example, a set top box (hereinafter "STB") or equivalent device can connect to a video server utilizing the video server's IP address to request and thereafter receive content. A STB is a device that connects to a television or the like and some external signal source, and turns the signal into content then displayed on the television screen. The signal source might be an Ethernet cable, a satellite dish, a coaxial cable, a telephone line (including DSL connections), Broadband over Power Line, or even an ordinary antenna. Content, in this context, could mean any or all of video, audio, Internet, interactive games, or the like.

STBs can include a stand-alone STB, a STB behind a home gateway router (HGR), a STB integrating a HGR, or an integrated media display or conventional personal computer instead of a STB. The STB's signal source directly or indirectly (e.g., through an access network) connects to a network. The access to the network can include fixed wireline access (e.g., Digital Subscriber Loop (DSL), cable modems, Ethernet, passive optical network (PON), etc.), mobile wireless access (e.g., Wideband Code Division Multiple Access (W-CDMA), Code Division Multiple Access 2000 (CDMA2000), Global System for Mobile Communications (GSM), General Packet Radio Service (GPRS), etc.), WiMAX, and fixed wireless access (e.g., wireless local area network (WLAN)).

Broadband networks operable to provide end-users with real-time, rich content are proliferating. End-users are deploying feature-rich STBs and content providers are increasing content and service offerings. For example, Video-on-Demand (hereinafter "VoD") is being increasingly offered to provide end-users content-on-demand. VoD systems generally allow end-users to select and watch video content over a network as part of an interactive television system. VoD systems either "stream" content, allowing viewing in real time, or "download" it in which the program is brought in its entirety to a user-device, such as the STB, before viewing starts. The latter is more appropriately termed "store and forward". Additionally, a combined method is also possible in which a certain amount of video is downloaded and pre-stored, and the playing can then start. This method allows playback to start faster, while compensating for limited rate download media or errored or otherwise delayed streams. The majority of cable and telco-based VoD systems use the streaming approach, whereby a user buys or selects content and it begins to play on the television set almost instantaneously. In addition to connecting to a VoD server, a STB can request services through IP from other devices, such as a cache server, a broadband remote access switch (BRAS), a peer-to-peer cache, a live-feed video encoder (e.g., from on-air, from satellite, from a network carrier feed, etc.), and the like.

Referring to FIG. 1, a STB 10 connects to a VoD controller 40 and multiple VoD servers 42 through an access/aggregation network 20 and a core network 30. Note that the VoD servers 42 can be located in another network behind the network 20 or integrated in the network 20. The STB 10 can include a stand-alone STB, a STB behind a home gateway router (HGR), a STB integrating a HGR, a gaming console used as STB, a user device such as a cell phone or PDA being used as display, or an integrated media display or conventional personal computer instead of a STB. The STB 10 also connects to a television 12 or the like. The access between the STB 10 and the access/aggregation network 20 can be DSL, PON, or the like.

In this exemplary embodiment, the VoD servers 42 are attached to the access/aggregation network 20 to provide faster response to local users, such as the STB 10. Alternatively, the VoD servers could be connected to the core network 30, and this would enable a wider community of users, but would reduce server 42 responsiveness. Servers 42 for traditional cable and telco VoD services are usually placed at a cable head-end serving a particular market as well as cable hubs in larger markets. In the telco world, they are placed in either the central office (CO), or a newly created location called a VHO or "Video Head-End Office".

The access/aggregation network 20 includes multiple switches/routers 22 which connect to the VoD servers 42 and the STB 10. Those of ordinary skill in the art will recognize other devices may be included between the STB 10 and the VoD servers 42. The core network 30 usually includes an edge router 34 and multiple core routers 32. The VoD controller 40 is a network-based server connected to the core network 30 configured to receive and process VoD requests, such as from the STB 10 through connection 52.

Typically the STB 10, such as a STB integrating a HGR, operates at the IP (OSI layer 3) layer. Often the access/aggregation network 20 operates at the Ethernet (OSI layer 2) layer (which previously was ATM layer 2). For example, the switches/routers 22 can include multi-service switches, BRAS, and the like. For example, a BRAS terminates layer two on the access side, linking a STB's IP layer to the core network IP layer. Currently, VoD servers 30 are attached to routers. A typical VoD transaction involves selecting content, such as using an electronic program guide from the STB 10, and a request is made over the networks 20,30 to the VoD server 40. The VoD controller 40 can include devices from Myrio Corp. of Bothell, Wash., Kasenna Inc. of Sunnyvale, Calif., Minerva Networks Inc. of Santa Clara, Calif., Orca Interactive Ltd. of Ra'anana, Israel, Microsoft Corp. of Redmond, Wash. There may be intermediate proxies to the VoD server 40 in the network, for example a hierarchical setup with smaller distributed VoD controllers in order to achieve large-scale network reliability and response times. The VoD servers 40 and associated infrastructure (e.g., all the way to billing) will authenticate the user/STB, possibly provide decryption keys, and instruct the STB 10 where to obtain the content, i.e. such as a connection 54 between the STB 10 and the VoD servers 42.

The STB 10 is instructed where to obtain the content via an IP address and usually other data (e.g., movie name, reference index, UDP port, etc), i.e. connection 54. Note that this address may be interpreted or provided via proxies, and possibly be redirected either locally or via secondary servers in order to locate the proper content location. Reasons for a redirect might be for example server occupation rate (e.g., busy or not), movie location (e.g., physical location), availability of the network 20,30 between servers, and the like. Thus existing systems and methods utilize the IP layer as a way to "dial" up between the STB 10 request and the video content. Because the address is IP layer three, this requires IP routers or the like to access the route and end points. At the user location, the STB 10 has an integrated router, or similar device providing layer three access.

The access/aggregation network 20 is composed either of routers or, alternatively, of Ethernet switches, possibly carrier Ethernet. Carrier Ethernet can include a combination of: Optical Transport Network (OTN) network (e.g., ITU-T G.709), Media Access Control-in-Media Access Control (MAC-in-MAC), Virtual Local Area Network (VLAN) queue-in-queue (Q-in-Q), Provider Backbone Transport (PBT), Provider Backbone Bridges (PBB), or the like. The VoD servers 42 usually are connected to a normal network router, although it might be a load balancing router, possibly able to operate at a higher OSI layer than IP but definitely including IP.

Thus current methods use IP and bookend routing capability to provide connectivity between the STB 10 and the VoD controller 40, and between the STB 10 and the VoD servers 42. Disadvantageously, access/aggregation networks 20 must include layer three capabilities at both ends (bookending the STB with a router at the VoD (or other video server) side); however these (aggregation/access) networks often operate at layer one, layer two, and combinations of layer one and two.

BRIEF SUMMARY OF THE INVENTION

In various exemplary embodiments, the present invention provides methods and systems to remove the dependence on the IP layer (OSI layer three) in transport networks for VoD or other video, such as broadcast, pay-per view, and other variants on VoD. The present invention replaces IP layer addressing with Ethernet layer two addressing and even layer one addressing, allowing connectivity in access/aggregation networks without IP layer three capabilities. The present invention enables STBs to communicate with VoD controllers, servers, and the like at layer two and/or layer one, eliminating the need for layer three routing capabilities in access/aggregation networks.

In an exemplary embodiment of the present invention, a method for transporting video includes receiving a request for network-based content, providing an Ethernet address responsive to the request for content, wherein the Ethernet address is the Ethernet address of the network-based content, and accessing the network-based content over an access/aggregation network with the Ethernet address. The network-based content includes any of Video-on-Demand, Internet Protocol Television, broadcast television, and Pay-Per-View. The receiving step includes a controller providing the Ethernet address for a server, wherein the server is configured to provide the network-based content to a user. The server is located in the access/aggregation network. The request for content comes from a set-top box. The access/aggregation network utilizes Carrier Ethernet, wherein Carrier Ethernet includes one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof. The accessing step includes any of MPEG, Windows Media Video, Flash Video, MPEG-4, DivX and File Transfer Protocol over Ethernet directly. The controller is located in a core network, wherein the core network includes both Internet Protocol and Ethernet capabilities. The controller is accessed directly through Ethernet only through one of an extended version of 802.1 Generic Attribute Registration Protocol (GARP), a Dynamic Host Configuration Protocol (DHCP), and a provided Ethernet address.

In another exemplary embodiment of the present invention, a method for transporting video over layer two networks includes receiving an Internet Protocol address for network-based content responsive for a request for content, mapping the Internet Protocol address to an Ethernet address, wherein the Ethernet address is the Ethernet address of the network-based content, and accessing the network-based content over an access/aggregation network with the Ethernet address. The receiving step includes a controller providing an Internet Protocol address for a server, wherein the server is configured to provide the network-based content to a user. The server is located in the access/aggregation network. The request for content comes from a set-top box. The access/aggregation network utilizes Carrier Ethernet, wherein Carrier Ethernet includes one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof. The accessing step includes any of MPEG, Windows Media Video, Flash Video, MPEG-4, DivX and File Transfer Protocol over Ethernet directly. The controller is located in a core network, wherein the core network includes both Internet Protocol and Ethernet capabilities. The controller is accessed directly through Ethernet only through one of an extended version of 802.1 Generic Attribute Registration Protocol (GARP), a Dynamic Host Configuration Protocol (DHCP), and a provided Ethernet address.

In yet another exemplary embodiment of the present invention, an access/aggregation network configured for interactive video transport includes one or more network elements connected to one or more users, wherein one of the one or more users requests content from a controller, and a server connected to one of the one or more network elements, wherein the server comprises content, wherein the controller provides an address responsive to content requests, the address includes one of an Ethernet Address and an Internet Protocol Address of the server, and the content is retrieved from the server with one of the Ethernet address and the Internet Protocol Address mapped to the Ethernet Address. The one of the one or more users request content through a set-top box connected to the access/aggregation network. The access/aggregation network utilizes Carrier Ethernet, wherein Carrier Ethernet includes one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides methods and systems to remove the dependence on the IP layer (OSI layer three) in VoD transport networks. The present invention replaces IP layer addressing with Ethernet layer two addressing or even layer one addressing, allowing connectivity in access/aggregation networks without IP layer three capabilities. The present invention enables STBs to communicate with VoD controllers, servers (including web servers), and the like at layer two and/or layer one, eliminating the need for layer three routing capabilities in access/aggregation networks.

Figure 1:
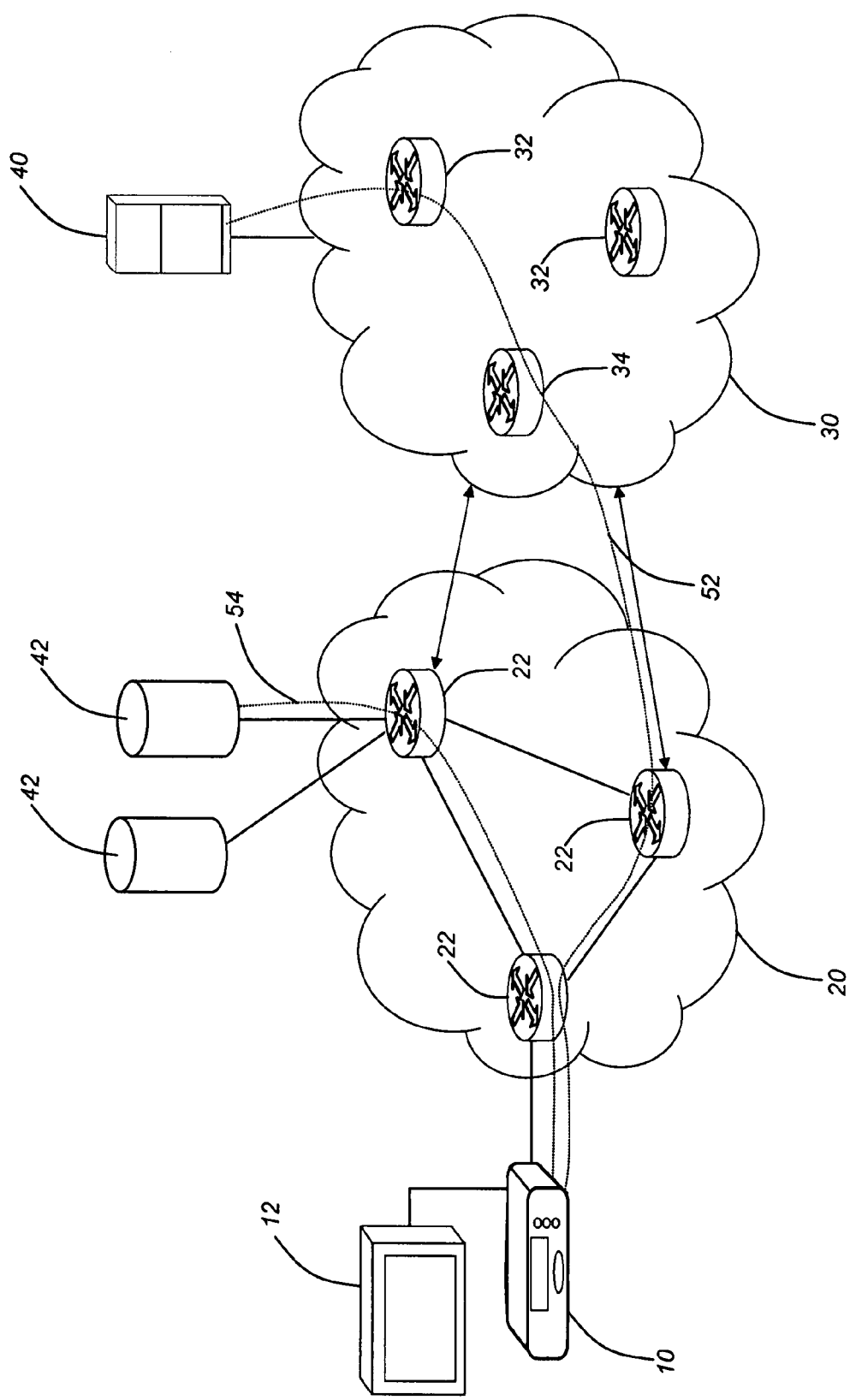
FIG. 1 is a block diagram of an exemplary video network illustrating a STB connected to a VoD controller and VoD servers through an access/aggregation and a core network with layer three routing capabilities.

As described herein in FIG. 1, the VoD controller 40 provides an IP address to the STB 10 for accessing content from the VoD servers 42. In one embodiment, the present invention changes the "pointer" to the content from an IP address (and associated higher layer information) to an Ethernet Address (and associated higher layer information perhaps including IP addressing with Internet applications). In another embodiment, the present invention provides an Ethernet Address directly instead on an IP address to allow the content to be accessed. The Ethernet information can be provided as a normal Ethernet address or as variations of Ethernet addresses such as those described herein with regards to FIG. 3. Additionally, a pointer could be still be an IP address, or a port within an IP address. The present invention removes the need for routers, the Ethernet is switched straight to the VoD servers 42. Note, VoD servers 42 can also be web servers or any other device configured to provide network resources or services, such as IPTV, Microsoft TV, Joost, Youtube, and the like.

In the present invention, the VoD controller 40 provides Ethernet (and possibly MPEG or other equivalent multiplexer) to the STB 10, instead of IP. Note that such addresses can be embedded in an Electronic Program Guide (EPG). The EPG is provided by the controller 40 or a program guide generator to the STB 10. For example, the EPG is the guide that is displayed on a television. Each program or station in the EPG has some associated data behind it when you select it, and this can additionally include the Ethernet address plus other data, such as MPEG multiplexing or channel name or program name or reference. Advantageously, only the Ethernet layer (and below) is needed, and the program reference.

Figure 2:
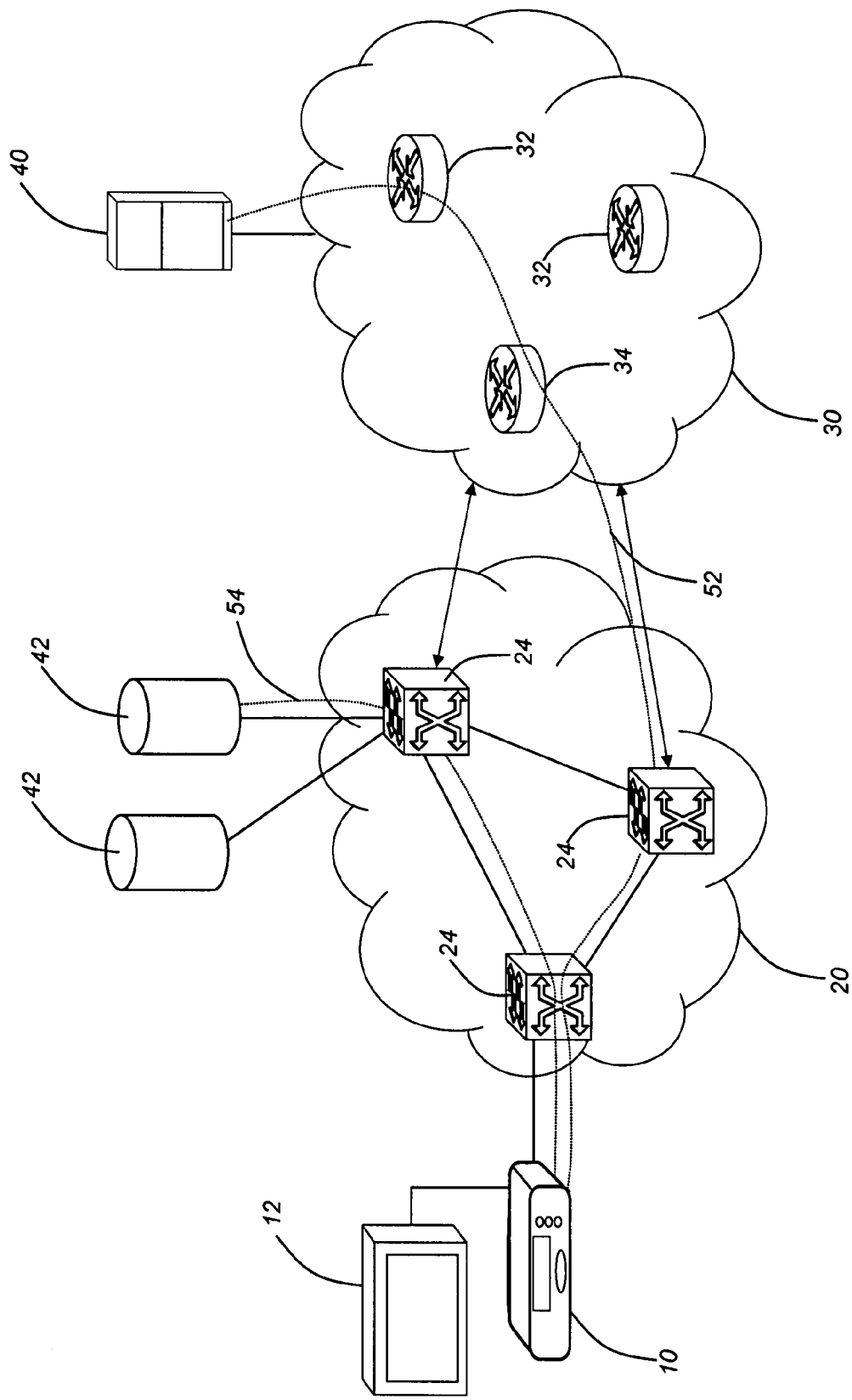
FIG. 2 is a block diagram of an exemplary embodiment of the present invention of a video network with Ethernet video transport capabilities between the STB and the VoD controller and VoD servers through an access/aggregation and a core network.

Referring to FIG. 2, the STB 10 connects to the VoD controller 40 and multiple VoD servers 42 through the access/aggregation network 20 and the core network 30, in an exemplary embodiment of the present invention. However the access/aggregation 20 network includes switches 24, and does not require layer three routing capabilities to connect the STB 10 to the VoD controller 40 and VoD servers 42. Advantageously, the access/aggregation 20 network (i.e., between the STB 10 or HGR and the VoD servers 42) can be Ethernet only including the connection from the VoD servers 42 to the access/aggregation 20 network. However, it is possible that there is a router (i.e., with IP layer three capabilities) between the STB 10 and the network-based VoD controller 40, however this is not a requirement because the STB 10 can connect to the VoD controller 40 through Ethernet only via simple provisioning, such as an extended version of 802.1 Generic Attribute Registration Protocol (GARP), Dynamic Host Configuration Protocol (DHCP), or providing an Ethernet address for the VoD controller 40. The access/aggregation network 20 and the core network 30 can include any type of network over any medium, such as optical, wireless, cable, and the like.

Similarly, the present invention allows the STB 10 to be non-IP aware for the purposes of this connection, either STB 10 to the VoD controller 40, STB 10 to the VoD servers 42, STB 10 to both the VoD controller 40 and VoD servers 42, or STB 10 to all services. It is fairly likely though that the STB 10 and HGR are IP aware. However, the present invention makes it Ethernet-only aware to work with a simpler access/aggregation 20 network, which is often Ethernet-only aware. For example, the STB 10 can be IP to a BRAS, but Ethernet only (plus whatever multiplexing layer is used) to the servers 42. Additionally, the present invention can be used to allow these connections to operate only lower than Ethernet on the OSI stack. This could include a wavelength, an OTN channel, an OTN sub-channel, a SONET/SDH channel, a wireless radio channel, and the like. Advantageously, the present invention provides a much simpler access/aggregation network 20. It remains likely (but not necessary) that the VoD servers 42 are IP aware. However the network 20 is not and the method to access the video or other content on the servers 42 does not depend on IP (or HTTP for web-based servers 42). For example, the content path (STB 10 to VoD server 42) is over Ethernet whereas the control channel (to the server 42 or to the server part of the VoD (for example done over RTCP) can be over IP over Ethernet. The server 42, a player (e.g., connected to the STB 10), and real-time player control (e.g., part of the player) are connected through Ethernet, but one or more of those could require IP. The present invention allows the video itself to be transported without IP, or alternatively that these components are connected via Ethernet only)

Figure 3:
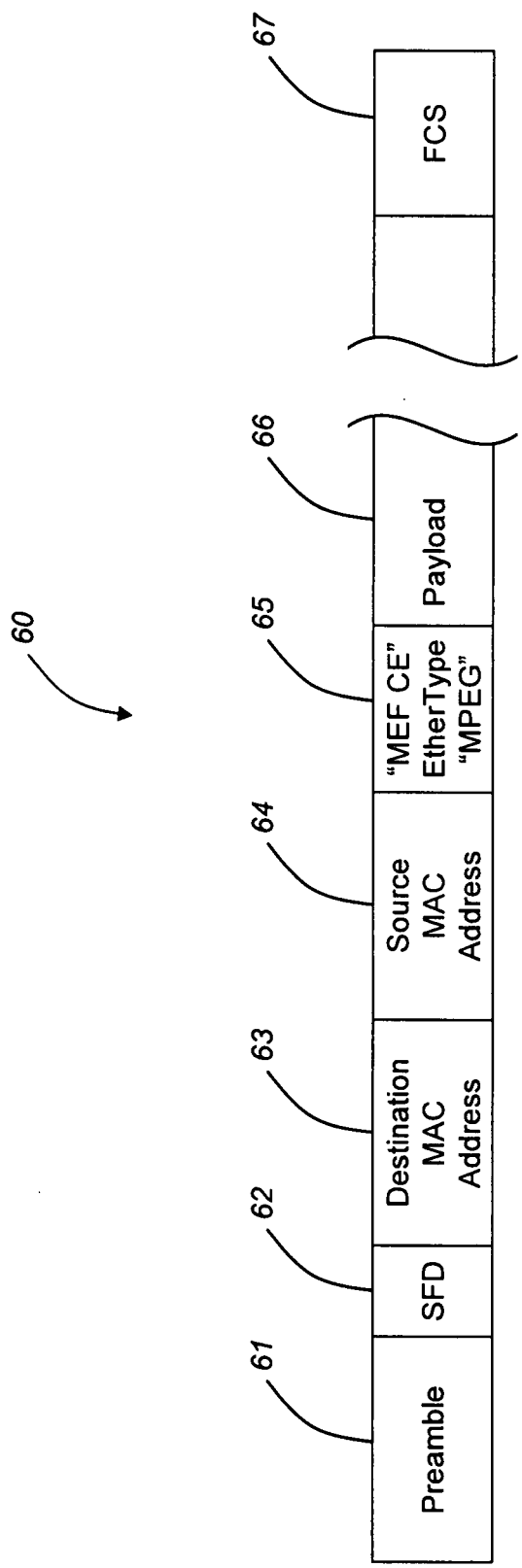
FIG. 3 is a diagram of an Ethernet frame according to an exemplary embodiment of the present invention to provide Ethernet video transport.

Referring to FIG. 3, an exemplary embodiment of an Ethernet frame 60 is illustrated. The frame 60 is a format of data packets on the physical wire. The frame 60 includes start bits known as a preamble 61, and a Frame Check Sequence (FCS) 67 at the frame end. The preamble 61 includes frame 60 information and signifies the start of a new frame 60. The FCS 67 signifies the end of the frame 60 and also includes verification information. The Start Frame Delimiter (SFD) 62 is an 8-bit value marking the end of the preamble 61 of the Ethernet frame 60. The SFD 62 is immediately followed by a destination MAC address 63 and source MAC address 64.

A Media Access Control address (MAC address) is a unique identifier attached to most network adapters (NICs). It is a number that acts like a name for a particular network adapter, so, for example, the network cards (or built-in network adapters) in two different computers will have different names, or MAC addresses, as would an Ethernet adapter and a wireless adapter in the same computer, and as would multiple network cards in a router. The destination MAC address 63 and source MAC address 64 provide a layer two Ethernet address for the frame. An EtherType field 65 is used to indicate which protocol is being transported in the Ethernet frame 60. Finally, a payload field 66 includes the frame 60 data, such as video transport.

In an exemplary embodiment of the present invention, the destination or source MAC address 63,64 could point to either the connection between the VoD servers 42 and the access/aggregation network 20 or all the way to the VoD servers 42. The outer label in a carrier Ethernet scenario could point similarly to either the connection between the VoD servers 42 and the access/aggregation network 20 or all the way to the VoD servers 42, or otherwise used in ways the labels would be used in a carrier Ethernet network.

Skipping the need for IP allows alternative transport methods, such as, for example, the video could be carried simply as Moving Picture Experts Group (MPEG) over Asynchronous Serial Interface (ASI) from a video source (e.g., located behind the VoD servers 42), and then as MPEG over Ethernet from the VoD servers to the STB 10, without resort to the complexities of an IP layer. This simply requires a unique EtherType field 65 for MPEG. Then across the Ethernet-only layer all the way to the STB 10. Alternatively, a Metro Ethernet Forum (MEF) encapsulation of Real Time Protocol (RTP)/Real Time Streaming Protocol (RTSP) can also support this. Additionally, the present invention can provide other method such as over layer 1 directly, i.e., the server provides only layer 1 plus a multiplexer.

The payload 66 includes the data stream, such as the video transport. For example, video can be transported through an MPEG transport stream or through the Real-Time Transport Protocol (RTP) without an IP layer and by encapsulating MPEG video. The MPEG transport stream is communications protocol for audio, video, and data which is specified in MPEG-2 Part 1, Systems (ISO/IEC standard 13818-1).

The video elements (e.g., VoD servers 42, VoD controller 40) can be aware of the Ethernet to IP mapping. This could be used for debugging any errors or other issues. For example, if the video is transported over IP, it is useful to have the VoD server 42 track the fact the video tunnel is Ethernet according to the present invention, and track Ethernet statistics (e.g., the carrier Ethernet outer-label related bit or CRC errors) and relate these to a given video flow. Additionally, it is also possible to reserve one Ethernet address per video flow, in order to provide better operations, administration, and maintenance (OAM) capabilities (e.g., one-to-one error tracking). Note, Ethernet is generally used as a pipe, in other words one or more flows of video, possibly over IP, may use this same Ethernet pipe.

In an exemplary embodiment, the present invention allows video transports over Carrier Ethernet. Carrier Ethernet can include a combination of: Optical Transport Network (OTN) network (e.g., ITU-T G.709), Media Access Control-in-Media Access Control (MAC-in-MAC), Virtual Local Area Network (VLAN) queue-in-queue (Q-in-Q), Provider Backbone Transport, or the like.

Advantageously, the present invention applies to anyone currently deploying Internet Protocol TV (IPTV) or other video services including but not limited to IP. Of note, access/aggregation networks 20 are typically found with telco service providers or cable/multiple system operator (MSO). The present invention allows the access/aggregation networks 20 to operate at layer two or below. Additionally, the present invention can obviate the IP layer entirely, for example, encapsulating MPEG over Ethernet directly. Additionally, the present invention can utilize formats such as Windows Media Video (WMV), MPEG-4, DivX (available from DivX, Inc.), File Transfer Protocol (FTP), Flash Video (FLV) and the like directly over Ethernet. This is more similar to classical video networks, saving bandwidth and possibly complexity. For example, Session Description Protocol (SDP) or the EPG could provide a key that is used as a program finder or reference with the key including an Ethernet Address and possibly sub-keys (multiplexer) such as an IP port, program name, program reference, and the like. Further, skipping the IP layer may provide network operators with reduced regulatory concerns.

Figure 4:
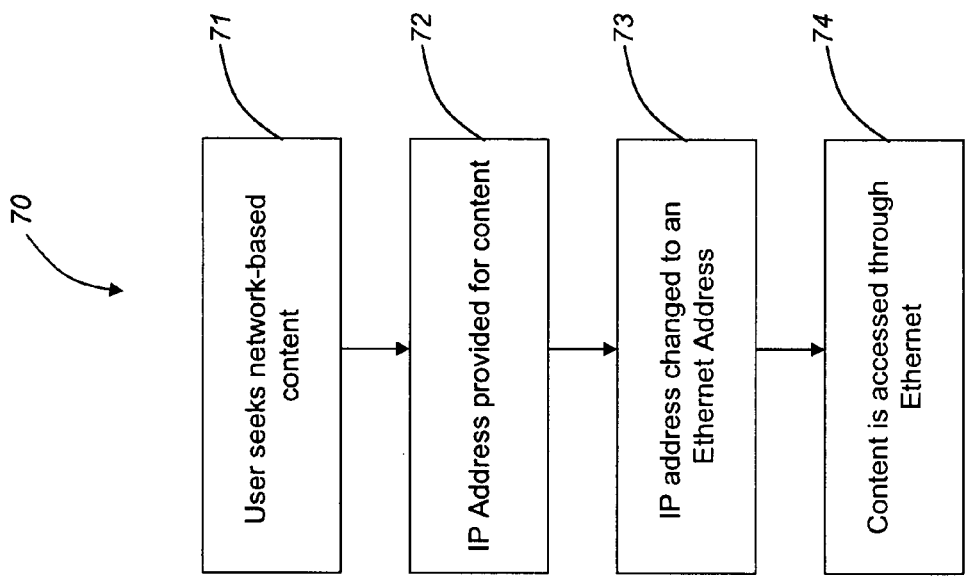
FIG. 4 is a flowchart illustrating an exemplary embodiment of the present invention to transport video over Ethernet.

Alternatively, similar Ethernet behavior can be achieved if the IP addresses are mapped every 32 addresses apart. This is because the IP multicast address is copied into the Ethernet MAC and every 32 avoids aliasing address duplication. However, this only applies to multicast, and most VoD services are single-cast. This is not a good method as it burns through IP addresses quickly especially when considering subnetting Referring to FIG. 4, a flowchart 70 illustrates an exemplary embodiment of the present invention. A user seeks network-based content (step 71). As described herein, this can include a user requesting VoD using a STB connecting to a network-based VoD controller, such as through an EPG. An IP address is provided for the content (step 72). Once the request is made and processed, the network-based controller provides an address for the content. The IP address is changed to an Ethernet address (step 73). Effectively, the present invention changes the pointer for the content from an IP address (and possibly with associated higher layer information) to an Ethernet address (and associated higher layer information possibly including IP addressing with Internet applications).

Note, the Ethernet information can be a normal Ethernet address or variations, such as Carrier Ethernet. In an exemplary embodiment, the present invention allows video transports over Carrier Ethernet. Carrier Ethernet can include a combination of: Optical Transport Network (OTN) network (e.g., ITU-T G.709), Media Access Control-in-Media Access Control (MAC-in-MAC), Virtual Local Area Network (VLAN) queue-in-queue (Q-in-Q), Provider Backbone Transport, or the like. Finally, content is accessed through Ethernet (step 74). Here, the present invention alleviates the need to have an IP layer in an access/aggregation network, allowing content to be retrieved solely at the Ethernet layer.

Figure 5:
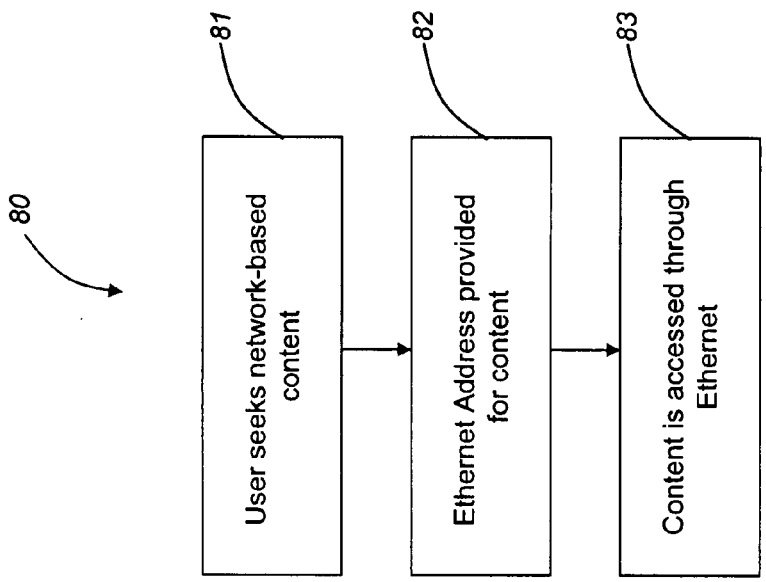
FIG. 5 is a flowchart illustrating another exemplary embodiment of the present invention to transport video over Ethernet.

Referring to FIG. 5, a flowchart 80 illustrates another exemplary embodiment of the present invention. A user seeks network-based content (step 81). As described herein, this can include a user requesting VoD using a STB connecting to a network-based VoD controller, such as through an EPG. An Ethernet Address is provided for the content (step 82). For example, the Ethernet Address can be embedded in the EPG. As described herein, the Ethernet information can be a normal Ethernet address or variations, such as Carrier Ethernet. Finally, content is accessed through Ethernet (step 84). Here, the present invention alleviates the need to have an IP layer in an access/aggregation network, allowing content to be retrieved solely at the Ethernet layer.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:
1. A method for transporting video, comprising:
  operating a Video-on-Demand transport network at an Internet Protocol (IP) layer on top of other layers;
  receiving a request for network-based content located in the Video-on-Demand transport network, the request comprising an IP address, wherein the Video-on-Demand transport network comprises a Video-on-Demand controller operating at the Internet Protocol layer, wherein the request comprises Moving Picture Experts Group (MPEG) multiplexing data;
  providing an Ethernet address responsive to the request for content from the Video-on-Demand controller, wherein the Ethernet address comprises the Ethernet address of the network-based content at an Ethernet layer, and wherein a pointer to the network-based content is changed from the IP address to the Ethernet address;

accessing the network-based content over an access/aggregation network with the Ethernet address at the Ethernet layer;

providing the network-based content using a unique Ether-Type field in Ethernet frames for the network-based content thereby encapsulating MPEG directly over Ethernet; and monitoring Ethernet to IP mapping at the Video-on-Demand Controller operating at the IP layer to gather Ethernet statistics of the providing step by the Video-on-Demand controller;

wherein the network-based content is connected to the access/aggregation network via one of a layer two or layer one connection and the access/aggregation network is not IP-aware, the method thereby allowing the network-based content to be accessed through the Video-on-Demand controller via only the Ethernet address while the Video-on-Demand controller operates at the IP layer.

2. The method for transporting video of claim 1, wherein the network-based content comprises any of Video-on-Demand, Internet Protocol Television, broadcast television, and Pay-Per-View.

3. The method for transporting video of claim 1, wherein the receiving step comprises a controller providing the Ethernet address for a server, wherein the server is configured to provide the network-based content to a user.

4. The method for transporting video of claim 3, wherein the server is located in the access/aggregation network.

5. The method for transporting video of claim 3, wherein the controller is located in a core network, wherein the core network includes both Internet Protocol and Ethernet capabilities.

6. The method for transporting video of claim 3, wherein the controller is accessed directly through Ethernet only through one of an extended version of 802.1 Generic Attribute Registration Protocol (GARP), a Dynamic Host Configuration Protocol (DHCP), and a provided Ethernet address.

7. The method for transporting video of claim 1, wherein the request for content comes from a set-top box; and wherein a key is provided by one of Session Description Protocol and an Electronic Program Guide responsive to the content request, the key comprises the Ethernet Address.

8. The method for transporting video of claim 1, wherein the access/aggregation network utilizes Carrier Ethernet, wherein Carrier Ethernet comprises one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof.

9. The method for transporting video of claim 1, wherein the accessing step comprises any of MPEG, Windows Media Video, Flash Video, MPEG-4, DivX and File Transfer Protocol over Ethernet directly.

10. A method for transporting video over layer two or layer one networks, comprising:

operating a Video-on-Demand transport network at an Internet Protocol (IP) layer on top of other layers;

receiving an Internet Protocol address for network-based content responsive to a request for content located in the Video-on-Demand transport network, wherein the Video-on-Demand transport network comprises a Video-on-Demand controller operating at the IP layer, wherein the request comprises Moving Picture Experts Group (MPEG) multiplexing data;

mapping the Internet Protocol address to an Ethernet address, wherein the Ethernet address comprises the Ethernet address of the network-based content at an Ethernet layer, and wherein a pointer to the network-based content is changed from the IP address to the Ethernet address to accommodate an access/aggregation network operating only at the Ethernet layer;

accessing the network-based content over the access/aggregation network with the Ethernet address;

providing the network-based content using a unique Ether-Type field in Ethernet frames for the network-based content thereby encapsulating MPEG directly over Ethernet; and monitoring Ethernet to IP mapping at the Video-on-Demand Controller operating at the IP layer to gather Ethernet statistics of the providing step by the Video-on-Demand controller, wherein one Ethernet address is reserved per video flow to provide one-to-one error tracking for operations, administration, and maintenance (OAM);

wherein the network-based content is connected to the access/aggregation network via one of a layer two or layer one connection and the access/aggregation network is not IP-aware, the method thereby allowing the network-based content to be accessed through the Video-on-Demand controller via only the Ethernet address while the Video-on-Demand controller operates at the IP layer.

11. The method for transporting video over layer two networks of claim 10, wherein the receiving step comprises a controller providing an Internet Protocol address for a server, wherein the server is configured to provide the network-based content to a user.

12. The method for transporting video over layer two networks of claim 11, wherein the server is located in the access/aggregation network.

13. The method for transporting video over layer two networks of claim 11, wherein the controller is located in a core network, wherein the core network includes both Internet Protocol and Ethernet capabilities.

14. The method for transporting video over layer two networks of claim 11, wherein the controller is accessed directly through Ethernet only through one of an extended version of 802.1 Generic Attribute Registration Protocol (GARP), a Dynamic Host Configuration Protocol (DHCP), and a provided Ethernet address.

15. The method for transporting video over layer two networks of claim 10, wherein the request for content comes from a set-top box; and wherein a key is provided by one of Session Description Protocol and an Electronic Program Guide responsive to the content request, the key comprises the Ethernet Address.

16. The method for transporting video over layer two networks of claim 10, wherein the access/aggregation network utilizes Carrier Ethernet, wherein Carrier Ethernet comprises one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof.

17. The method for transporting video over layer two networks of claim 10, wherein the accessing step comprises any of MPEG, Windows Media Video, Flash Video, MPEG-4, DivX and File Transfer Protocol over Ethernet directly.

18. An access/aggregation network configured for video transport, comprising:
- one or more network elements connected to one or more users forming a Video-on-Demand transport network at an Internet Protocol (IP) layer on top of other layers, wherein one of the one or more users requests content from a controller; and
- a server connected to one of the one or more network elements via one of a layer two or layer one connection such that connections between the one or more network elements and the server are not IP-aware, wherein the server comprises content, and wherein the server is configured to be addressed via an IP Address in the Video-on-Demand transport network;
- wherein the controller provides an address responsive to content requests, wherein the content requests comprise Moving Picture Experts Group (MPEG) multiplexing data;
- wherein the address comprises an Ethernet Address of the server;
- wherein the content is retrieved from the server with the IP Address mapped to the Ethernet Address by the server thereby allowing the content to be accessed from the server only via the Ethernet address while the server operates at the IP layer;
- wherein a pointer to the network-based content is changed from the IP address to the Ethernet address by the server;
- wherein the content is provided using a unique EtherType field in Ethernet frames thereby encapsulating MPEG directly over Ethernet; and
- wherein the server operating at the IP layer is configured to monitor Ethernet to IP mapping to gather Ethernet statistics, wherein one Ethernet address is reserved per video flow to provide one-to-one error tracking for operations, administration, and maintenance (OAM).

19. The access/aggregation network configured for interactive video transport of claim 18, wherein the one of the one or more users request content through a set-top box connected to the access/aggregation network; and
- wherein a key is provided by one of Session Description Protocol and an Electronic Program Guide responsive to the content request, the key comprises the Ethernet Address.

20. The access/aggregation network configured for interactive video transport of claim 19, wherein the access/aggregation network utilizes Carrier Ethernet, wherein Carrier Ethernet comprises one or more of Optical Transport Network (OTN), Media Access Control-in-Media Access Control (MAC-in-MAC), Virtual Local Area Network (VLAN) queue-in-queue (Q-in-Q), Provider Backbone Transport, and combinations thereof.

* * * * *